Figure 1:
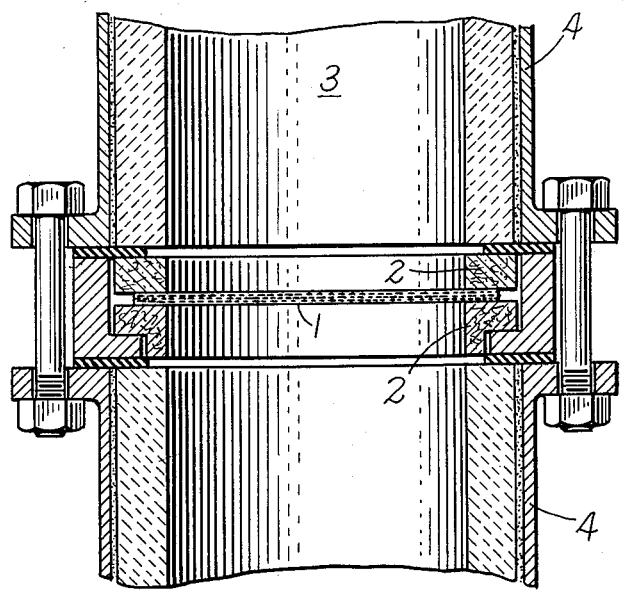

Dec. 30, 1958     C. T. KAUTTER ET AL     2,866,692
CATALYTIC APPARATUS AND METHOD FOR PROTECTING
A METALLIC CATALYST AGAINST INJURY
Filed June 24, 1955

INVENTORS
Carl T. Kautter
Willigis Leitenberger
BY
Curtis, Morris & Safford
ATTORNEYS

2,866,692

CATALYTIC APPARATUS AND METHOD FOR PROTECTING A METALLIC CATALYST AGAINST INJURY

Carl T. Kautter and Willigis Leitenberger, Darmstadt, Germany, assignors to Röhm & Haas G. m. b. H., Darmstadt, Germany Application June 24, 1955, Serial No. 517,838

Claims priority, application Germany June 28, 1954

11 Claims. (Cl. 23—288)

This invention relates to a method for protecting a metal catalyst against injury, to a metal catalyst so protected, and to an improved catalytic apparatus.

The use of metals of the eight group of the periodic system having atomic numbers between 44 and 78, i. e., platinum, iridium, osmium, palladium, rhodium and ruthenium, or other noble metals or alloys thereof as catalysts in the form of netting, wire mesh or gauze, chips, balls, or the like, is well known in a number of important industrial processes. Thus, for example, the use of platinum catalysts, a term used herein to refer to catalysts of or containing platinum, is well known in the preparation of hydrocyanic acid by catalytic reaction of methane with ammonia, in platforming operations, and in the synthesis of certain vitamins. In many of these processes, particularly those involving the catalytic conversion of hydrocarbons in the presence of other gases at temperatures of the order of 1000° C., a deposition of carbon and corrosion of the catalyst takes place in a peripheral zone which includes the places at which the catalyst and the reaction vessel touch or are near each other.

Several solutions to this problem have heretofore been offered. Thus, for example, in U. S. Patent 1,957,749, a solution was proposed which involves rinsing the vulnerable catalyst area adjacent the reaction chamber walls with a gas or gas mixture free from constituents depositing carbon at the operating temperature of the reaction chamber. This solution requires, among other changes in the apparatus structure, a means for preheating the rinsing gas and, in many instances, an installation for properly preparing the rinsing gas, e. g., by removing carbon-forming components from industrial gases. Other proposed solutions include feeding oxygen into the vulnerable zone or otherwise heating the zone to a temperature high enough to avoid depositing carbon on the vulnerable peripheral area of the catalyst. These solutions have not been entirely satisfactory because they involve a considerable alteration of apparatus, require additional control and do not completely inhibit the deposition of carbon and the consequent corrosion of expensive catalyst.

We have made the surprising discovery that injury due to corrosion of metallic catalysts, particularly in the form of netting, gauze, wire mesh, or the like, can be practically completely avoided by coating the vulnerable area, i. e., the portion touching and adjacent the walls of the reaction chamber, with a refractory material that is inert to the catalyst. In the preferred embodiment of the invention, the vulnerable area of catalyst is provided with an intimately bonded coating of aluminum oxide, magnesium oxide, zinc oxide or a mixture of any two or three of these oxides.

One preferred method involves applying a premixed, aqueous paste of the oxide or hydroxide of magnesium, zinc, or aluminum, or a mixture thereof, to the peripheral portion of the catalyst netting. The coating so obtained is then dried and in that condition will adhere sufficiently firmly to the netting to permit securing the catalyst within a reaction chamber. Under the conditions of operation of the catalytic reaction, the paste on the netting will become dehydrated and form an anhydrous oxide coating on the wire which is substantially gas-tight. If desired, the peripheral zone of a netting coated with aluminum oxide may be heated to a temperature high enough to convert the amorphous gamma form of the oxide into the crystalline form, i. e., the hexagonal configuration of corundum.

In accordance with another embodiment, aluminum or zinc is electrolytically deposited on the peripheral portion of a platinum or platinum-containing netting, as described for example by Dadieu in "Monatsheften für Chemie," (1926), Vol. 47, pages 505–506, and thereafter converted into the corresponding oxide by conventional methods. If desired, an intermediate film of copper or silver may be applied to the catalyst before depositing the aluminum or zinc.

When the catalyst is in the form of a wire netting or the like, it is convenient to clamp the netting between ceramic or asbestos packings so that the catalyst will span the reaction chamber. This may be done after or before the vulnerable catalyst zone is coated with the refractory oxide.

The utility and advantages of the apparatus and method of the invention will become further apparent from the following descrpition made with reference to the accompanying drawing, which is included as illustrative of the best mode now contemplated for carrying out the invention.

Figure 2:
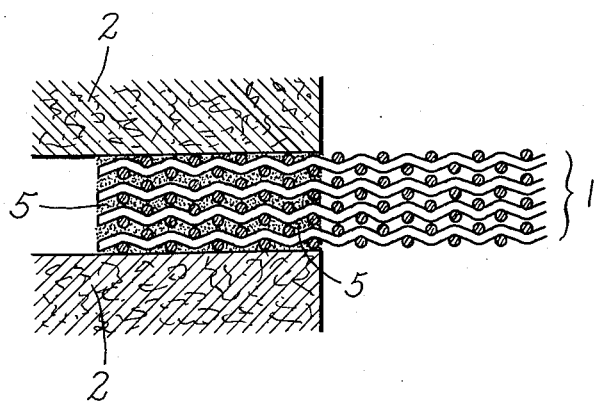

In the drawing:

Figure 1 is a cross-sectional view in elevation of a catalytic reaction chamber equipped with a mesh catalyst in accordance with the invention; and Figure 2 is an exploded view of a portion of Figure 1.

In the drawing, several catalyst meshes such as platinum are shown as being clamped between packing rings 2, preferably of deformable asbestos, within a reaction chamber 3 formed by the wall 4 of a vessel. The peripheral zone or portions of the wire meshes that are vulnerable to corrosion are shown schematically at 5 as having been coated with a refractory material such as an oxide of aluminum, magnesium or zinc.

Tests have shown that platinum and platinum-containing wire mesh catalysts coated with a paste of magnesium hydroxide, or aluminum hydroxide, and clamped between asbestos packing and tensioning rings showed no signs of injury due to corrosion or other causes after as many as 8000 hours of operation in a process for the manufacture of hydrocyanic acid from methane and ammonia. Similar wire mesh catalysts not protected with oxide coatings showed appreciable corrosion at the periphery after only 200 hours of operation under otherwise identical conditions.

It is to be understood that modifications and variations will readily occur to those skilled in the art upon reading this description. All such variations and modifications are intended to be included within the scope of the invention as defined in the accompanying claims.

We claim:

1. A method for protecting a wire mesh catalyst comprising a metal of the eighth group of the periodic system and having an atomic number between 44 and 78 in a reaction chamber against injury in a peripheral zone adjacent the wall of the reaction chamber which comprises coating the catalyst in said zone with a refractory coating selected from the group consisting of aluminum oxide, magnesium oxide, zinc oxide and mixtures thereof.

2. A method for protecting a platinum wire mesh catalyst against injury in the vulnerable zone adjacent the wall of a reaction chamber which comprises coating the catalyst in said zone with an aqueous paste of a member selected from the group consisting of the oxides and hydroxides of aluminum, magnesium, zinc and mixtures thereof, and dehydrating the paste for forming an adherent coating of the corresponding oxide.

3. The method defined in claim 2 wherein the catalyst is coated with an aqueous paste convertible into an adherent and protective layer of aluminum oxide upon the application of heat thereto.

4. The method defined in claim 2 wherein the catalyst is coated with an aqueous paste convertible into an adherent and protective layer of magnesium oxide upon the application of heat thereto.

5. The method defined in claim 2 wherein the catalyst is coated with an aqueous paste convertible into an adherent and protective layer of zinc oxide upon the application of heat thereto.

6. A method for protecting a platinum wire mesh catalyst against injury in the vulnerable zone adjacent the wall of a reaction chamber which comprises electrolytically depositing aluminum onto the catalyst in said zone and thereafter converting the aluminum into aluminum oxide.

7. A method for protecting a platinum wire mesh catalyst against injury in the vulnerable zone adjacent the wall of a reaction chamber which comprises electrolytically depositing zinc onto the catalyst in said zone and thereafter converting the zinc into zinc oxide.

8. A wire mesh metal catalyst having a peripheral portion and a central portion, the peripheral portion being protected against injury by a refractory coating selected from the group consisting of aluminum oxide, magnesium oxide, zinc oxide and mixtures thereof.

9. A wire mesh platinum catalyst having a peripheral portion and a central portion, the peripheral portion being protected against injury by a refractory coating selected from the group consisting of aluminum oxide, magnesium oxide, zinc oxide and mixtures thereof.

10. In catalytic apparatus for the manufacture of hydrocyanic acid from methane and ammonia, said apparatus comprising a reaction chamber spanned by a metal wire mesh catalyst, the improvement which comprises a refractory coating of an oxide selected from the group consisting of aluminum oxide, magnesium oxide, zinc oxide and mixtures thereof on the peripheral portion of the catalyst.

11. In catalytic apparatus for the manufacture of hydrocyanic acid from methane and ammonia, said apparatus comprising a reaction chamber spanned by a platinum wire mesh catalyst, the improvement which comprises a refractory coating of an oxide selected from the group consisting of aluminum oxide, magnesium oxide, zinc oxide and mixtures thereof on the peripheral portion of the catalyst.

References Cited in the file of this patent

UNITED STATES PATENTS

| | | |
|---|---|---|
| 1,157,293 | Brockbank | Oct. 19, 1915 |
| 1,318,936 | Toniolo | Oct. 14, 1919 |
| 1,508,061 | Perley | Sept. 9, 1924 |
| 1,722,339 | Pauling | July 30, 1929 |
| 2,016,810 | De Jahn | Oct. 8, 1935 |
| 2,171,230 | Wamsley | Aug. 29, 1939 |
| 2,276,229 | Dixon | Mar. 10, 1942 |
| 2,351,415 | Farrell | June 13, 1944 |
| 2,406,172 | Smithells | Aug. 20, 1946 |
| 2,552,279 | Houpt | May 8, 1951 |
| 2,584,080 | Houpt | Jan. 29, 1952 |
| 2,731,541 | Houdry | Jan. 17, 1956 |

FOREIGN PATENTS

| | | |
|---|---|---|
| 181,486 | Great Britain | June 15, 1922 |
| 358,013 | Great Britain | Mar. 22, 1930 |
| 394,406 | Great Britain | June 29, 1933 |